Aug. 16, 1932.  J. G. ELDRIDGE  1,872,259
YIELDING CONNECTION
Filed Sept. 22, 1928
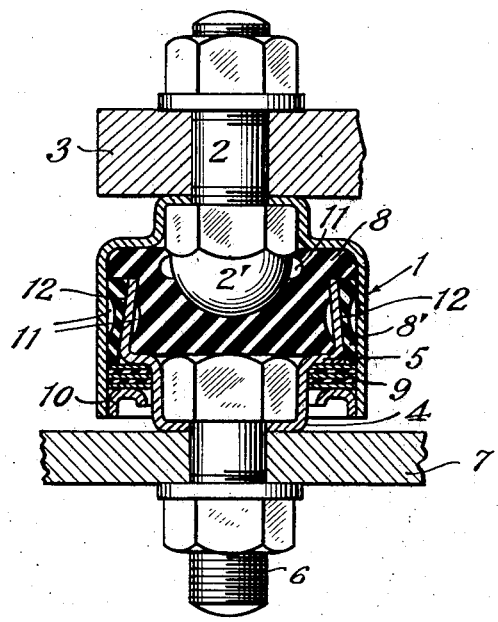
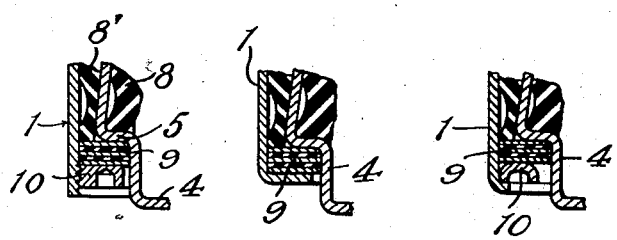
Fig. 2.   Fig. 4.   Fig. 3.
INVENTOR
Jess G. Eldridge
BY
ATTORNEY Patented Aug. 16, 1932

1,872,259

UNITED STATES PATENT OFFICE

JESS G. ELDRIDGE, OF DETROIT, MICHIGAN, ASSIGNOR TO THE MECHANICAL RUBBER COMPANY, OF CLEVELAND, OHIO, A CORPORATION OF NEW JERSEY

YIELDING CONNECTION

Application filed September 22, 1928. Serial No. 307,577.

This invention relates to non-metallic connections, more particularly to cushion connections such as for mounting automobile engines.

One object of the invention is to provide a device of the foregoing character embodying only a few inexpensive simple parts which are easy to manufacture and assemble. In carrying out this object there is provided a pair of substantially cup-shaped metallic members, one of which is smaller than the other and adapted to project within the larger, the smaller being inverted with respect to the larger. The two members are fastened together and a suitable cushion of rubber composition insulates the two members from each other. Each of the members is provided with means of connection to relatively movable parts, such as the supporting arm of a motor and the chassis frame of a vehicle, respectively. The metallic parts are preferably produced by metal pressing machinery, and the rubber cushion by ordinary molding methods, and then the metallic parts assembled with the rubber cushion to form the finished article. In this way a manufacturer of metal goods may provide the metal parts only, and a rubber manufacturer the rubber cushion. This specialized method of manufacture constributes to cost reduction and has other advantages.

Another object is to provide a cushion connection adapted to absorb high frequency vibrations of small amplitude, and in which the rubber composition cannot escape when heavily compressed.

Another object is to prevent lateral shifting of the relatively movable parts secured together by the connection.

Further objects and advantages will appear as the description proceeds.

Reference is to be had to the following specification and accompanying drawing in which:

Fig. 1 is a vertical section of a connection constructed in accordance with the invention; and Figs. 2, 3 and 4 are fragmental details.

Referring to the drawing, which illustrates one practical embodiment of the invention, reference character 1 represents a substantially cup-shaped metallic member which is preferably connected by means of a stud 2 and a nut 2' to the supporting arm 3 of a motor. A smaller cup-shaped member designated 4 projects within the larger cup-shaped member 1 and is inverted with respect thereto. The cup-shaped member 4 is preferably reduced to form a shoulder 5 and is fastened by means of a bolt 6 to the chassis frame 7 of a motor vehicle. The cup-shaped member 4 is sufficiently smaller than the enclosing cup-shaped member 1 to provide a clearance space between the two, and elements of suitable vulcanized rubber composition in the form of a main core 8 and a surrounding ring 8' are molded to shape and interposed between the cup-shaped members 1 and 4, whereby to cushion and insulate one member from the other. The cushioning elements 8 and 8' are preferably formed by ordinary molding methods of rubber composition having suitable characteristics, and fill the spaces formed between the cup-shaped members 1 and 4.

After assembling the molded rubber elements 8 and 8' and the metallic members 1 and 4, a non-metallic packing or washer 9 which may consist for instance of suitable rubber composition or rubber alternated with fabric, is placed over the reduced portion of the smaller cup-shaped member 4 so as to fit against the shoulder portion 5, the washer being of a size to bridge the space between the reduced stem beneath the shoulder of the member 4 and the interior wall of the larger member 1. A retaining ring 10 is secured within the mouth of the large cup-shaped member 1 by any suitable means, such as threading, welding or spinning and is effective to clamp the washer 9 against the shoulder 5 and thereby hold the two cup-shaped members together in cooperative relation with the rubber elements 8, 8' and 9. The retaining ring 10 clamps the washer 9 under sufficient tension to obtain satisfactory cushioning characteristics for the rubber elements 8 and 8' as will be readily understood, and seals the connection of the two members, thereby preventing oil and air from having access to the rubber. Fig. 2 illustrates a type of retaining ring threaded into the mouth of the large cup-shaped member 1, spanner holes being provided to accommodate a suitable wrench. Fig. 3 illustrates one way in which the bottom edge of the larger cup-shaped member 1 may be rolled inward beneath the ring 10, and Fig. 4 shows the bottom edge rolled deeper, in which latter case the ring 10 need not be used.

The head of the bolt 6 and the nut 2' disposed within their respective cup-shaped members 4 and 1, may be of the ordinary flat type, or one or both may be rounded in substantially hemispherical shape, such as the illustrated nut 2' of the stud 2, whereby to aid the cup-shaped members 1 and 4 to prevent lateral shifting of the arm 3 with respect to the frame 7. The rubber elements 8 and 8' may be also provided with a series of grooves or pockets 11 to permit flow of the rubber 8 and 8' under load. The side walls of the small cup-shaped member 4 are preferably tapered slightly as indicated at 12 opposite to the adjacent wall of the large member 1, and the rubber elements 8 and 8' will be correspondingly tapered to fit the wedge shaped space thus produced between the side walls of the two cup-shaped members. It will be seen that the rubber parts 8 and 8' cannot escape from the members 1 and 4 and are consequently capable of sustaining a heavier load than similar types of connections heretofore used. According to the preferred practice, the rubber ring element 8' is made of somewhat harder stock than the core 8, in order to maintain desired lateral stability.

It is to be understood that the foregoing connection is not confined to motor vehicles but is suitable for use as a shock insulator and connection for any two relatively movable parts wherein it is desired to prevent lateral shifting of the parts and provide for cushioning high frequency vibrations of small amplitude.

Having thus described my invention, what I claim and desire to protect by Letters Patent is:

1. A cushioning connection comprising a pair of substantially cup-shaped metallic members one of which is smaller than the other, the smaller member projecting into the larger and being inverted with respect to the larger, rubber composition interposed between said members, fasteners passing through each of said members to connect them respectively to relatively movable parts, at least one of said fasteners including a substantially hemispherical portion projecting within the rubber composition, and means for holding said members and said rubber composition in cooperative relation.

2. A cushioning connection comprising a pair of substantially cup-shaped metallic members one of which is smaller than the other, the smaller member projecting into the larger and being inverted with respect to the larger, rubber composition interposed between the members, fasteners passing through said members whereby to connect them respectively to relatively movable parts, the fasteners having heads disposed within their respective cups, the head of at least one of said fasteners being rounded in substantially hemispherical form and projecting within the rubber composition, the side walls of the smaller member being tapered with respect to the adjacent walls of the larger member, a retaining ring secured in the mouth of the larger member, and a non-metallic washer held by said retaining ring against the smaller member whereby to maintain both of said members and the rubber composition in cooperative relation.

3. A cushioning connection comprising a pair of substantially cup-shaped metallic members one of which is smaller than the other, the smaller member projecting into the larger and being inverted with respect to the larger, rubber composition interposed between the members, fasteners passing through said members to connect them respectively to relatively movable parts, one of said fasteners having a substantially flat head, the other fastener having a substantially hemispherical head projecting within the rubber composition, said smaller member having an annular shoulder, a retaining ring secured within the mouth of the larger member, and a non-metallic washer held by said ring against said shoulder to hold said members and the rubber composition in cooperative relation.

4. A cushioning connection comprising a pair of substantially cup-shaped metallic members one of which is smaller than the other, the smaller projecting into the larger and being inverted with respect to the larger, and rubber composition interposed between said members, said composition including a core portion and a separate ring disposed around the core between the outer wall of the smaller member and the inner wall of the larger, and means including a packing for holding said members and said composition in cooperative relation and completely sealing the rubber within the two members.

5. A cushioning connection comprising a pair of substantially cup-shaped metallic members one of which is smaller than the other, the smaller projecting into the larger and being inverted with respect to the larger, and rubber composition interposed between said members, said composition including a core portion and a separate ring disposed around the core between the outer wall of the smaller member and the inner wall of the larger, and means for holding said members and said composition in cooperative relation, said ring being composed of harder stock than the core, said holding means including a packing adapted in cooperation with said members to completely encase the rubber composition.

Signed at Detroit, county of Wayne, State of Michigan, this 17th day of September, 1928.

JESS G. ELDRIDGE.